Figure 1:
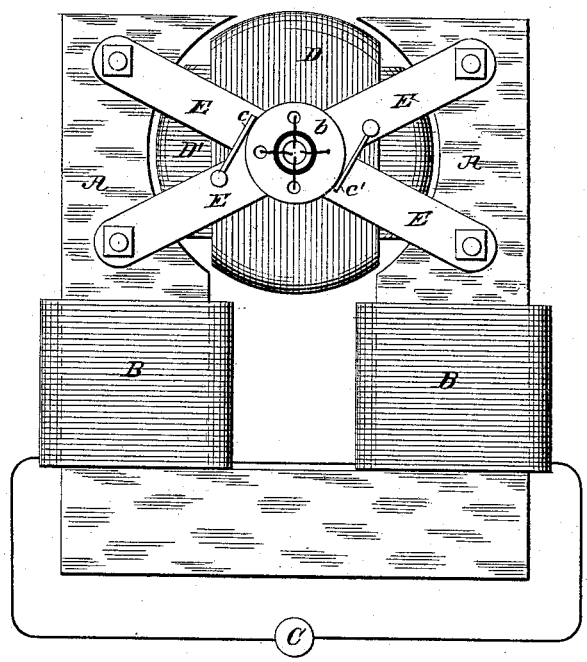

(No Model.) 2 Sheets—Sheet 1.

N. TESLA.
ELECTRO MAGNETIC MOTOR.

No. 381,969. Patented May 1, 1888.

WITNESSES:
Robt. F. Gaylord
Frank B. Murphy

INVENTOR.
Nikola Tesla.
Duncan, Curtis
& Page
BY ATTORNEYS.

N. PETERS, Photo-Lithographer, Washington, D. C.

(No Model.) 2 Sheets—Sheet 2.

N. TESLA.
ELECTRO MAGNETIC MOTOR.

No. 381,969. Patented May 1, 1888.

WITNESSES:
Robt. F. Gaylord
Frank B. Murphy

INVENTOR
Nikola Tesla
BY Duncan, Curtis & Page
ATTORNEYS

UNITED STATES PATENT OFFICE.

NIKOLA TESLA, OF NEW YORK, N. Y., ASSIGNOR OF ONE-HALF TO CHARLES F. PECK, OF ENGLEWOOD, NEW JERSEY.

ELECTRO-MAGNETIC MOTOR.

SPECIFICATION forming part of Letters Patent No. 381,969, dated May 1, 1888.

Application filed November 30, 1887. Serial No. 256,562. (No model.)

*To all whom it may concern:*

Be it known that I, NIKOLA TESLA, from Smiljan Lika, border country of Austria-Hungary, now residing in New York, in the county and State of New York, have invented certain new and useful Improvements in Electro-Magnetic Motors, of which the following is a specification, reference being had to the drawings accompanying and forming a part of the same.

In an application filed by me October 12, 1887, No. 252,132, I have shown and described a novel form of electro-magnetic motor and a mode of operating the same, which may be generally described as follows: The motor is wound with coils forming independent energizing-circuits on either the armature or field magnet, or both, (it is sufficient for present purposes to consider the case in which the coils are on the armature alone,) and these coils are connected up with corresponding circuits on an alternating-current generator. As the result of this, currents of alternately-opposite direction are sent through the energizing-coils of the motor in such manner as to produce a progressive shifting or rotation of the magnetic poles of the armature. This movement of the poles of the armature obviously tends to rotate the armature in the opposite direction to that in which the movement of the poles takes place, owing to the attractive force between said poles and the field-magnets, and the speed of rotation increases from the start until it equals that of the generator, supposing both motor and generator to be alike.

As the poles of the armature are shifted in a direction opposite to that in which the armature rotates, it will be apparent that when the normal speed is attained the poles of the armature will assume a fixed position relative to the field-magnet, and that in consequence the field-magnets will be energized by magnetic induction, exhibiting two distinct poles, one in each of the pole-pieces. In starting the motor, however, the speed of the armature being comparatively slow, the pole-pieces are subjected to rapid reversals of magnetic polarity; but as the speed increases these reversals become less and less frequent, and finally cease when the movement of the armature become synchronous with that of the generator. This being the case, the field-cores and the pole-pieces of the motor become a magnet, but by induction only.

I have found that advantageous results are secured by winding the field-magnets with a coil or coils and passing a continuous current through them, thus maintaining a permanent field, and in this feature my present invention consists.

I shall now describe the apparatus which I have devised for carrying out this invention and explain the mode of using or operating the same.

Figure 2:
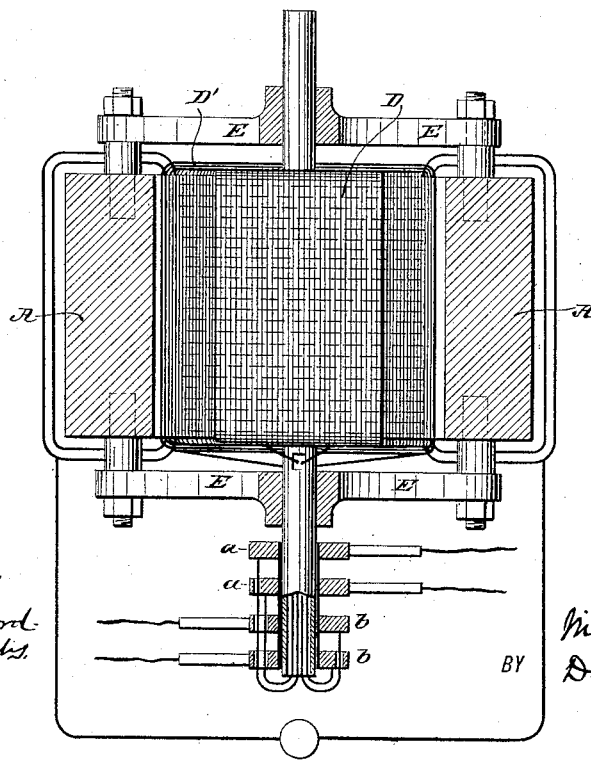
Figure 3:
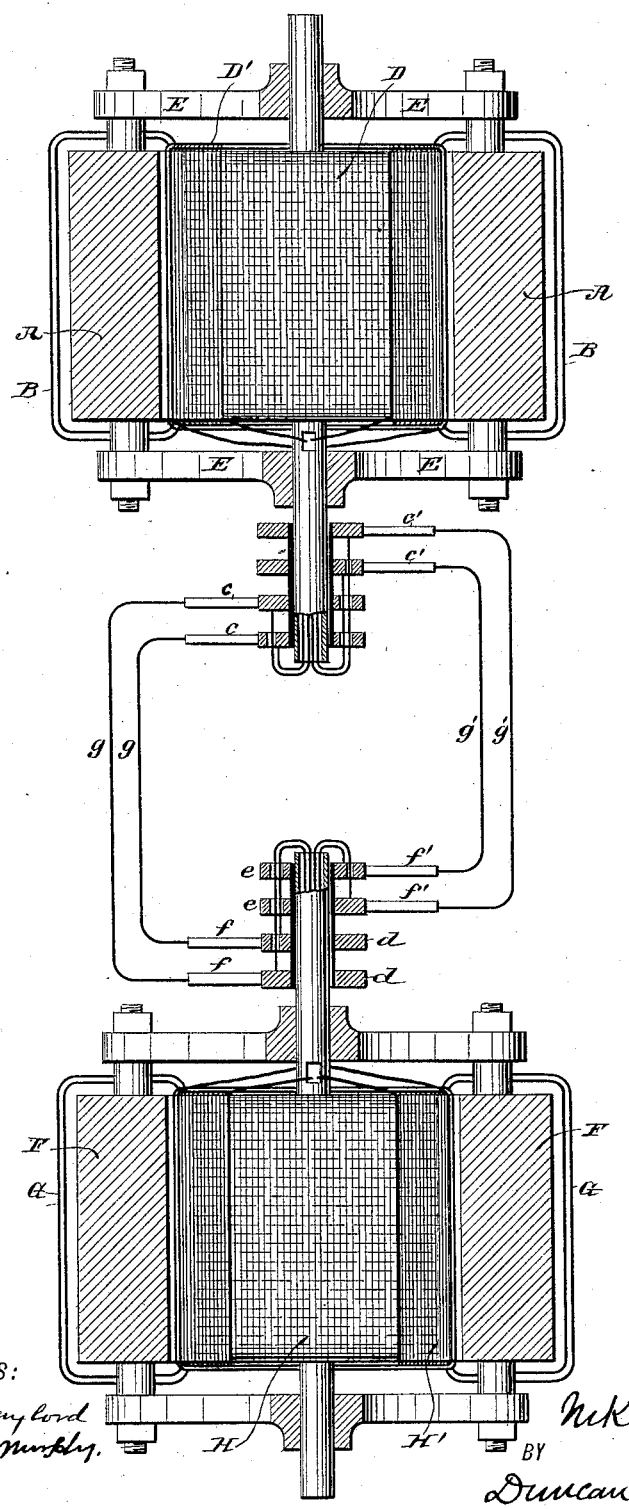

Figure 1 is an end view in elevation of my improved motor. Fig. 2 is a part horizontal central section, and Fig. 3 is a diagrammatic representation of the motor and generator combined and connected for operation.

Let A A in Fig. 1 represent the legs or pole-pieces of a field-magnet, around which are coils B B, included in the circuit of a continuous-current generator, C, which is adapted to impart magnetism to the said poles in the ordinary manner.

D D' are two independent coils wound upon a suitable cylindrical or equivalent armature-core, which, like all others used in a similar manner, should be split or divided up into alternate magnetic and insulating parts in the usual way. This armature is mounted in non-magnetic cross-bars E E, secured to the poles of the field-magnet. The terminals of the armature-coils D D' are connected to insulated sliding contact-rings $a\ a\ b\ b$, carried by the armature shaft, and brushes $c\ c'$ bear upon these rings to convey to the coils the currents which operate the motor.

The generator for operating this motor is or may be of precisely identical construction; and for convenience of reference I have marked in Fig. 3 its parts, as follows: F F, the field-magnets, energized by a continuous current passing in its field-coils G G; H H', the coils carried by the cylindrical armature; $d\ d\ e\ e$, the friction or collecting rings, carried by the armature-shaft and forming the terminals of the armature-coils; and $f\ f'$, the collecting-brushes which deliver the currents developed in the armature-coils to the two circuits $g\ g'$, which connect the generators with the motor.

The operation of this system will be understood from the foregoing. The action of the generator, by causing a progressive shifting of the poles in the motor-armature, sets up in the latter a rotation opposite in direction to that in which the poles move. If, now, the continuous current be directed through the field coils, so as to strongly energize the magnet A A, the speed of the motor, which depends upon that of the generator, will not be increased, but the power which produces its rotation will be increased in proportion to the energy supplied through the coils B B.

It is characteristic of this motor that its direction of rotation is not reversed by reversing the direction of the current through its field-coils, for the direction of rotation depends not upon the polarity of the field, but upon the direction in which the poles of the armature are shifted. To reverse the motor, the connections of either of the circuits g g' must be reversed.

I have found that if the field-magnet of the motor be strongly energized by its coils B B and the circuits through the armature-coils closed, assuming the generator to be running at a certain speed, the motor will not start; but if the field be but slightly energized or in general in such condition that the magnetic influence of the armature preponderates in determining its magnetic condition the motor will start and, with sufficient current, will reach its maximum or normal speed. For this reason it is desirable to keep at the start and until the motor has attained its normal speed, or nearly so, the field-circuit open or to permit but little current to pass through it. I have found, however, if the fields of both the generator and motor be strongly energized that starting the generator starts the motor, and that the speed of the motor is increased in synchronism with the generator. Motors constructed and operated on this principle maintain almost absolutely the same speed for all loads within their normal working-limits; and in practice I have observed that if the motor be overloaded to such an extent as to check its speed the speed of the generator, if its motive power be not too great, is diminished synchronously with that of the motor.

I have in other applications shown how the construction of these or similar motors may be varied in certain well-known ways—as, for instance, by rotating the field about a stationary armature or rotating conductors within the field; but I do not illustrate these features further herein, as with the illustration which I have given I regard the rest as within the power of a person skilled in the art to construct.

The present form of motor is cheap, simple, reliable, and easy to maintain. It requires the simplest type of generator for its operation, and when properly constructed shows a high efficiency.

I do not claim herein the method of transmitting power which this system involves, having made it the subject of another application for patent.

What I claim is—

The combination, with a motor having independent energizing or armature circuits, of an alternating-current generator with corresponding induced circuits connected with the motor for effecting a progressive shifting of the poles of the motor-armature, and a source of continuous current for energizing the field of said motor, as set forth.

NIKOLA TESLA.

Witnesses:
 FRANK B. MURPHY,
 FRANK E. HARTLEY.